Oct. 16, 1951  R. D. NELSON  2,571,472
SHORT-CIRCUITING FUSE CONSTRUCTION
Filed May 15, 1946  3 Sheets-Sheet 1

INVENTOR.
ROLLAND D. NELSON
BY
Austin R. Woolfolk
ATTORNEY.

Oct. 16, 1951  R. D. NELSON  2,571,472
SHORT-CIRCUITING FUSE CONSTRUCTION
Filed May 15, 1946  3 Sheets-Sheet 3

INVENTOR.
ROLLAND D. NELSON
BY
Arthur R. Woolfolk
ATTORNEY.

Patented Oct. 16, 1951

2,571,472

UNITED STATES PATENT OFFICE 2,571,472

SHORT-CIRCUITING FUSE CONSTRUCTION

Rolland D. Nelson, Hales Corners, Wis., assignor to McGraw Electric Company, a corporation of Delaware Application May 15, 1946, Serial No. 669,816

1 Claim. (Cl. 175—294)

This invention relates to a short-circuiting fuse construction.

Single phase taps are frequently taken off from two lines of a three phase grounded wye circuit to supply single phase power at a given point. These single phase branch lines are provided with a fuse in each line in the usual practice. However, if a permanent ground fault should occur in a single phase branch line, the fuse in one side of such line would blow but the single phase load voltage would become the phase to ground voltage which is only 58% of the normal phase to phase voltage. This means that the single phase devices supplied by the branch line, which may consist of motors and similar equipment, may burn out.

Objects of this invention are to provide a short-circuiting fuse construction which will prevent burning out of equipment on a single phase branch line from a three phase grounded wye and which also gives full protection for the three phase line from faults occurring on the single phase branch.

In greater detail, further objects are to provide a short-circuiting fuse construction which will prevent single phase to ground operation of a distribution system in the event of blowing of a single fuse in a phase-to-phase tap from a three phase line, and to so construct the device that in addition to the above discussed protection there will be secured all of the ordinary protection against overload or faults other than those due to grounds.

An embodiment of the invention is shown in the accompanying drawings, in which—

Figure 1:
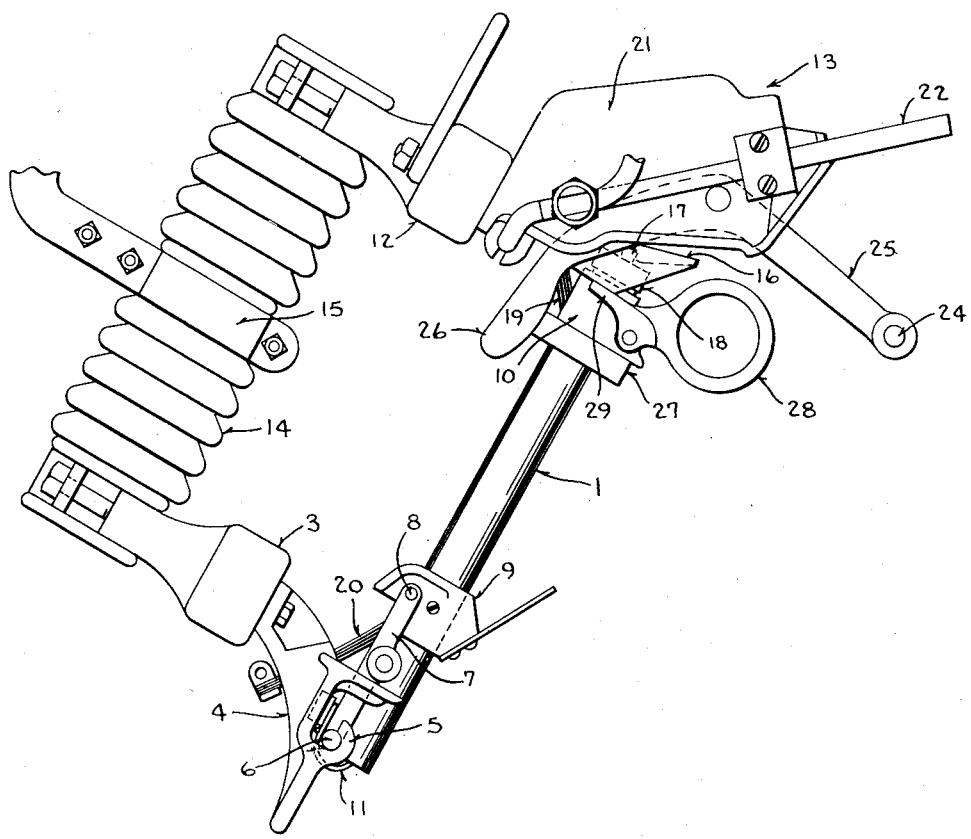
Figure 1 is a side elevation of the invention showing both of the drop-out fuses in position.

Referring to the drawings, it will be seen that the device comprises two drop-out fuses indicated by the reference characters 1 and 2. These drop-out fuses are supported at their lower ends from a transverse insulating bar 3. This insulating transverse lower bar 3 carries a pair of lower terminal members indicated generally by the reference character 4. These terminal members are provided with hook-like portions 5 which receive the outwardly projecting trunnions 6 of a lever or hinge member 7 whose upper end is pivoted as indicated at 8 to a collar 9 fixedly attached to the fuse tube. The fuse link extends from the upper terminal 10 of the fuse tube through the open bottom thereof and is attached in any suitable manner to the lower portion of the lever or hinge member 7. The fuse link is indicated by the reference character 11.

The device is provided with an upper transverse insulating bar 12 which carries the upper terminals indicated generally by the reference character 13. The upper and lower transverse insulating bars are carried in any suitable manner, as by means of a support 14 which may be a porcelain insulator which, in turn, is supported from any suitable support by means of a bracket 15.

Figure 3:
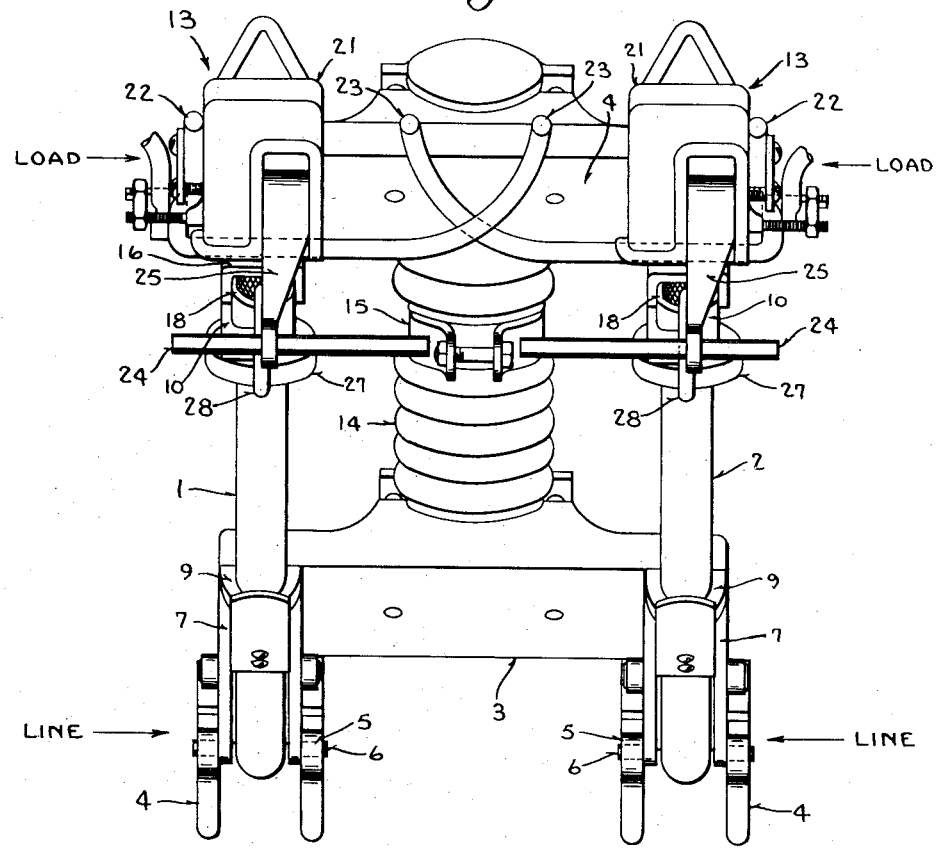
Figure 3 is a front view of the device.

Each upper terminal 13 is provided with a spring pressed latch member 16 which engages the upper projecting pin 17 of the cap 18 of the fuse tube. Preferably, the upper and lower terminals 4 and 13 are provided with brush contacts 19 and 20 which respectively engage the upper terminal 10 of the fuse tube and the lower hinge member or lever 7. The upper terminals are each equipped with a sleet hood 21. These upper terminals are each provided with an outer contact arm 22 and an inner contact arm 23. The inner contact arms 23 are arranged so that the inner contact arm from one upper terminal is positioned adjacent the other upper terminal, as shown in Figure 3. A bridging switch member or shorting switch member 24 is carried by a switch arm 25 for each upper terminal 13 and each switch arm 25 is spring pressed so that it tends to quickly move in a counter-clockwise direction when released in a manner hereinafter described.

The construction of the upper terminals and the switch arms may be substantially as shown in the patent to Schultz and Steinmayer No. 2,265,765 of December 9, 1941, for Repeating Fuse Construction, assigned to the assignee of the present application, except that there is no time delay mechanism provided for the switch arm. In other words, the switch arm when released is arranged to quickly move to closed or short-circuiting position.

Figure 2:
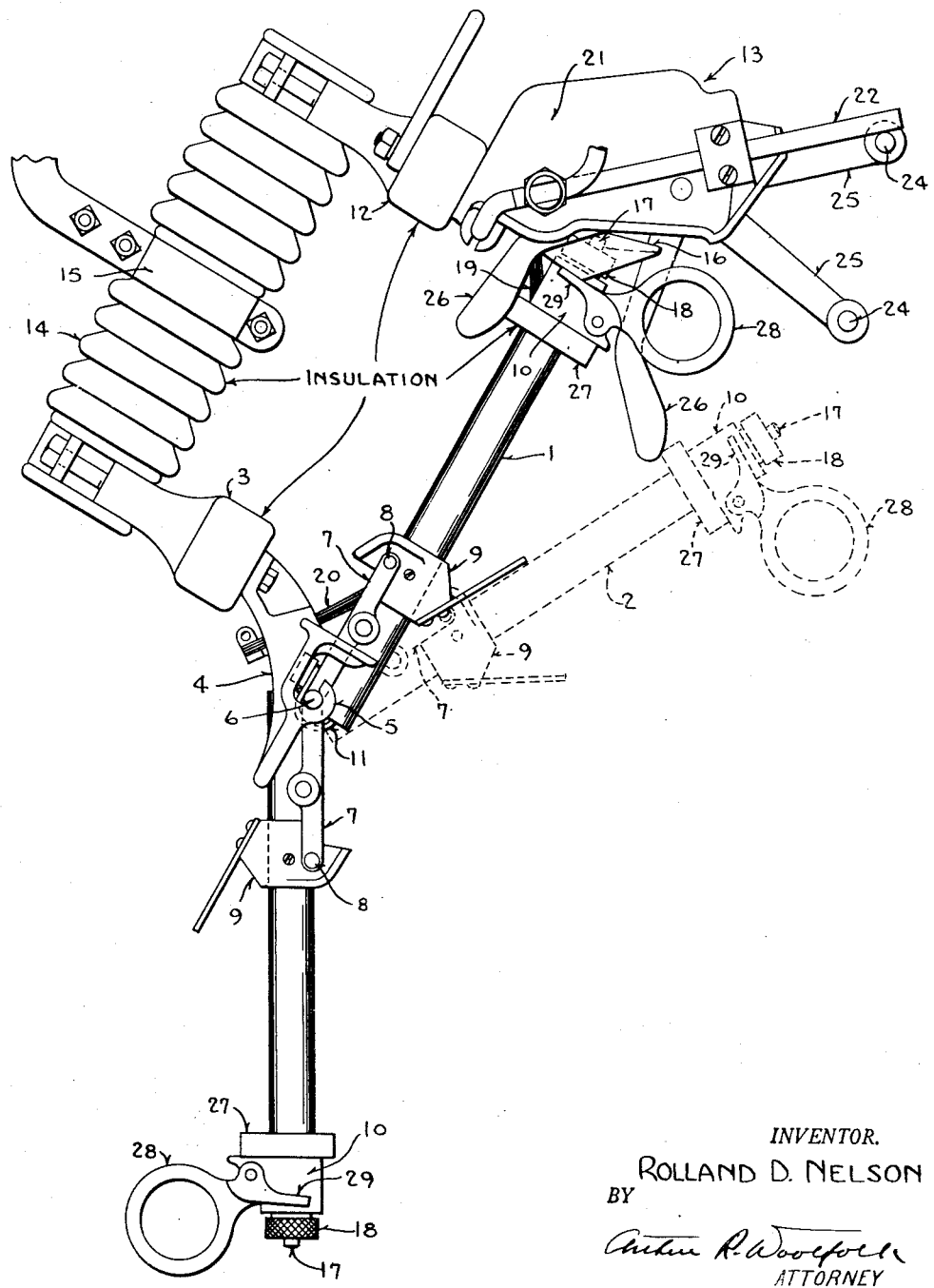
Figure 2 is a view corresponding to Figure 1 showing one of the drop-out fuses in its lowermost or dropped out position and showing in dotted lines the position that a fuse device assumes at the instant it begins to open the short-circuiting switch when the device is being reclosed.

Each switch arm 25 is provided with a downward and rearwardly located extension 26, see Figures 1 and 2, which normally is engaged by a Bakelite or other insulating disk or enlargement 27 carried by each of the fuse tubes. This Bakelite or other insulating member 27 serves, therefore, to restrain the switch arm from moving to shorting position. If desired, a manual releasing means may be provided in the form of a lever provided with an eyelet 28 adapted to receive a switch hook so that when the eyelet is pulled downwardly an extension arm 29 serves to raise the latch 16 and release the corresponding fuse tube.

On overload it is apparent that the fuse link 11 when ruptured will release the lever or hinge member 7 and allow the fuse tube to move downwardly, thus disengaging itself from the latch 16 and thereafter allowing forward and downward rocking of the fuse tube.

Figure 4:
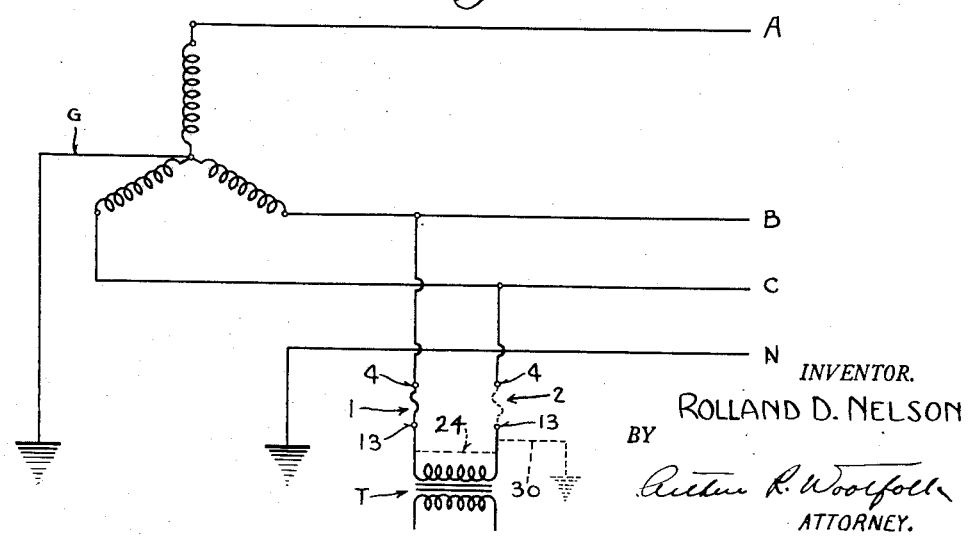
Figure 4 is a wiring diagram showing the manner in which the device is connected and showing in dotted lines the circuit when one side of a single phase branch line is grounded.

The upper terminals 13 constitute the load terminals and the lower terminals 4 constitute the line terminals as is apparent from an inspection of the wiring diagram shown in Figure 4.

The operation of the apparatus is as follows:

Assume that a ground occurs, for example as shown by the dotted line 30 in Figure 4. It is apparent that the fuse link of the fuse tube 2 would blow and the fuse tube 2 would drop downwardly and its shorting switch 24 would connect the inner arm 23 of the other upper terminal 13 with the outer arm 22 of the upper terminals for the fuse tube 2. This would short the other side of the branch line as shown in Figure 4 and would cause the fuse link of the fuse tube 1 to blow and thus would completely isolate the branch line.

The above description would be better understood by reference to the wiring diagram shown in Figure 4, which shows a grounded wye system in which the center point of the three phase supply is grounded as indicated at G and in which a grounded neutral N is provided. The three lines of the three phase wye system are indicated by the reference characters A, B, and C. It will be seen that a single phase tap has been taken from two of the lines B and C of this three phase grounded wye system. The load, not shown, is supplied through a transformer T and the device forming the subject matter of this invention is interposed between the transformer and the lines B and C. If an overload occurs, it is obvious that one or both of the fuses will blow and the shorting switch 24 or shorting switches 24 will come into operation and form a short circuit on the load side of the fuses and nothing further will happen. However, if on the other hand a ground fault should occur as indicated in dotted lines in Figure 4 and as hereinabove described, it is apparent that the appropriate fuse would blow and would release its shorting switch 24 which would short-circuit the single phase line on the load side and would cause the other fuse to immediately blow, thus completely isolating the single phase load from the three phase system and preventing line to ground under voltage operation.

It will be seen that in refusing no thought is required on the part of the operator as he merely detaches the blown fuse assembly by means of a switch stick in the usual manner. Thereafter he refuses it and replaces it by means of a switch stick and then rocks the fuse tube back into operative position. During the latter portion of this closing, upward rocking motion of the fuse tube, it is clear from an examination of Figure 2 that the insulating ring or member 27 carried by the fuse tube first engages the extension 26 of the shorting switch and moves the switch from shorting position prior to the time that the upper terminal of the fuse tube engages the upper stationary terminal.

This invention provides a simple and dependable means for protecting against all ordinary overloads on a single phase line supplied from a three phase grounded wye system, and in addition to this, provides protection against a fault due to grounding one or both sides of the single phase line.

Although this invention has been described in considerable detail, it is to be understood that such description is intended as illustrative rather than limiting, as the invention may be variously embodied and is to be interpreted as claimed.

I claim:

A short-circuiting fuse construction comprising a pair of fuse assemblies, each fuse assembly including an upper load terminal and a lower line terminal, a fuse tube supported from said lower terminal and arranged for drop-out motion, a fuse link in each fuse tube normally restraining the fuse tube from drop-out motion, each fuse assembly having a bell crank lever pivoted on the upper terminal and provided with a short-circuiting bar at one end arranged to short-circuit the upper terminals, said shorting bar biased towards short-circuiting position, and an insulating collar carried by each fuse tube and arranged to engage the other end of the corresponding bell crank lever to hold said shorting bar in open circuit position when said fuse tube is in restrained position, each collar being arranged to move its corresponding short-circuiting bar to open position when the corresponding fuse tube is moved to operative position and prior to the time that such fuse tube arrives at operative position.

ROLLAND D. NELSON.

REFERENCES CITED

The following references are of record in the file of this patent:

UNITED STATES PATENTS

| Number | Name | Date |
| --- | --- | --- |
| 435,114 | De Ferranti | Aug. 26, 1890 |
| 825,333 | Morganthaler | July 10, 1906 |
| 1,528,199 | Evans | Mar. 3, 1925 |
| 1,692,138 | Orr et al. | Nov. 20, 1928 |
| 2,089,387 | Lemmon | Aug. 10, 1937 |
| 2,265,765 | Schultz et al. | Dec. 9, 1941 |
| 2,376,789 | Leonard | May 22, 1945 |